R. S. MERRILL.
Picture-Hook.
No. 200,213.  Patented Feb. 12, 1878.
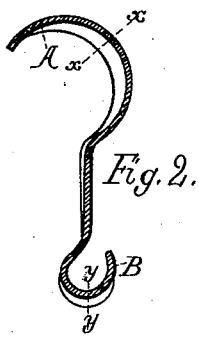
Fig. 3.
Fig. 4.
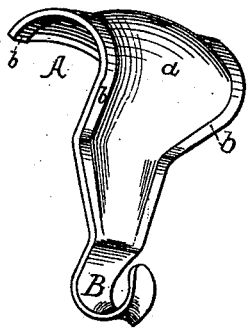
Fig. 1.
Witnesses:
Inventor:
Rufus S. Merrill
by M V Bailey
his Attorney

UNITED STATES PATENT OFFICE.

RUFUS S. MERRILL, OF BOSTON, MASSACHUSETTS.

IMPROVEMENT IN PICTURE-HOOKS.

Specification forming part of Letters Patent No. 200,213, dated February 12, 1878; application filed January 19, 1878.

*To all whom it may concern:*

Be it known that I, RUFUS S. MERRILL, of the city of Boston, State of Massachusetts, have invented certain new and useful Improvements in Picture-Hooks, of which the following is a specification:

Letters Patent Nos. 194,707 and 194,708, dated August 28, 1877, have heretofore been granted me for certain improvements in picture-hooks.

In the manufacture of sheet or wrought metal picture-hooks in accordance with my Letters Patent No. 194,708, I have made certain improvements therein, which add materially to the value and efficacy of the hook.

In the patented hook the molding or rail-hook end is broad, so as to take an extended bearing on the molding, the object being to distribute the strain over a considerable portion of the molding, as well as to give strength to the hook and to reduce its liability to spring or unbend.

I have found that the result last mentioned can be still further enhanced by forming the hook with one or more longitudinal corrugations, which bulge outwardly—that is, to the front of the hook—and which serve to stiffen it and to remove all danger of its springing or getting out of shape. The corrugation is preferably formed centrally of the hook, leaving on each side a smooth or flat surface, which will take an even bearing on the molding. I am in this way enabled to reduce the amount of metal in the hook without detracting from its strength; and I can also make the rail or molding end of the sheet or wrought metal hook much narrower, so that indeed the hook may be of the same, or nearly the same, width from one end to the other. I also round or bend the edges of the hook at the picture end, so that they shall not chafe or cut the picture cord or wire that passes over them.

The nature of my improvements and the manner in which the same are or may be carried into effect will be understood by reference to the accompanying drawings, in which—

Figure 1 is a perspective view of a picture-hook embodying my invention in its preferred form. Fig. 2 is a longitudinal central section of the same. Fig. 3 is a transverse section along the line $x\ x$ through the bend of the hook at the rail or molding end. Fig. 4 is a like section through the bend of the hook at the picture end along the line $y\ y$.

The hook is made of wrought or sheet metal, and, as shown, has approximately an S shape, with the hook end A to engage the molding or picture-rail, and the hook end B to hold the cord or wire that sustains the picture. Longitudinally of the hook extends a stiffening-corrugation, $a$, (shown plainly in section in Fig. 3,) which preferably stops short of the side edges of the hook, leaving on each side a flat or plane bearing-surface, $b$, by which the hook can take a smooth and even bearing on the molding or picture-rail. The stiffening-corrugation may extend throughout the entire length of the hook; but this is not absolutely indispensable, so long as it is so formed as to properly stiffen the hook at the bend or bends.

The edges of the hook in the bend at the hook end B are bent downwardly, as shown in section in Fig. 4, in order that they may not cut or injuriously affect the picture cord or wire that passes over and is held in the bend of said hook.

Having described my improvements, I will state my claims as follows:

1. A wrought or sheet metal picture-hook, of S shape, approximately, formed with one or more longitudinal stiffening-corrugations, as and for the purposes set forth.

2. A wrought or sheet metal picture-hook, of S shape, approximately, formed with one or more longitudinal stiffening-corrugations, bounded by flat or plane bearing-surfaces, substantially as set forth.

3. The wrought or sheet metal picture-hook, broad at the rail end and narrower at the picture end, formed with one or more longitudinal stiffening-corrugations, bounded by plane bearing-surfaces, with the edges of the bend of the lower or picture end rounded or bent, substantially as set forth.

In testimony whereof I hereunto subscribe my name in the presence of two witnesses.

RUFUS S. MERRILL.

Witnesses:
M. GEORGU,
JNO. D. PATTEN.